United States Patent [19]
Helmy

[11] Patent Number: 5,813,365
[45] Date of Patent: Sep. 29, 1998

[54] MODULAR FLOORING SYSTEM

[75] Inventor: Nashat N. Helmy, Golden Valley, Minn.

[73] Assignee: Tandem Products, Inc., Minneapolis, Minn.

[21] Appl. No.: 812,567

[22] Filed: Mar. 6, 1997

[51] Int. Cl.$^6$ .................................................. A01K 1/015
[52] U.S. Cl. ........................... 119/528; 119/445; 119/529
[58] Field of Search ................................... 119/445, 503, 119/516, 525, 528, 529, 530

[56] References Cited

U.S. PATENT DOCUMENTS

| | | | |
|---|---|---|---|
| 801,900 | 10/1905 | Newall | 119/528 |
| 4,628,662 | 12/1986 | Nooyen | 119/530 X |
| 4,796,563 | 1/1989 | Keuter | 119/530 |
| 4,953,501 | 9/1990 | Moreau | 119/528 |
| 5,596,951 | 1/1997 | Lagadec | 119/525 |

Primary Examiner—Robert P. Swiatek
Assistant Examiner—Elizabeth Shaw
Attorney, Agent, or Firm—Nawrocki, Rooney & Sivertson

[57] ABSTRACT

A flooring system for use in an animal shelter. The flooring system is modular and includes a disassemblable base frame having, as components thereof, a pair of end crossbars, a plurality of longitudinally extending support members, and interconnecting elements. When assembled, the base frame is formed by interconnecting the end crossbars by means of laterally spaced support members. The interconnecting elements, in turn, interconnect adjacent support members and the interconnecting elements extend generally transverse to those members. The modular flooring system also includes at least one first panel and a second panel supported on the base frame. The one or more first panels are generally coplanar, and the second panel includes a portion, intended to support an animal mother when feeding her young, which is positioned to define a second plane, elevated above the first plane, and a ramp portion angling downwardly from the second plane defining portion toward each first panel. Elements are provided to locate the first and second panels on the frame in desired positions.

18 Claims, 10 Drawing Sheets

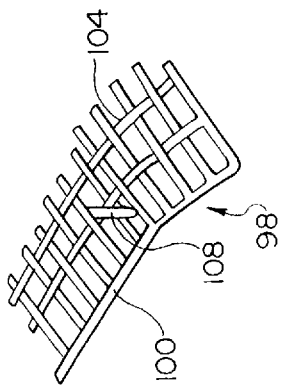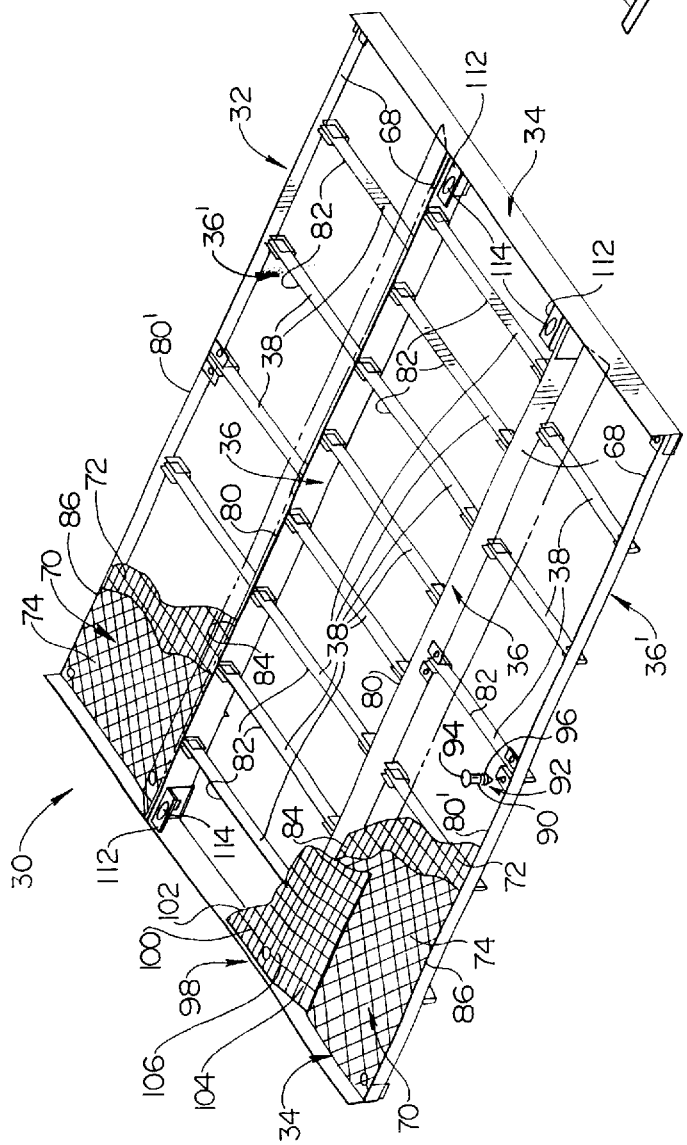

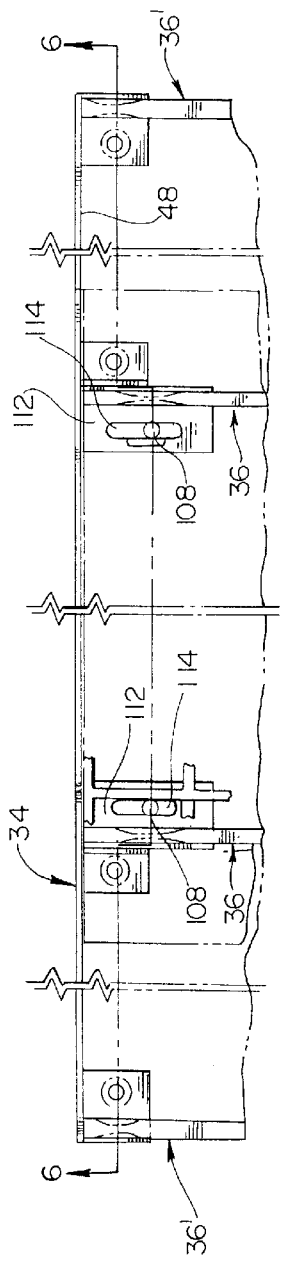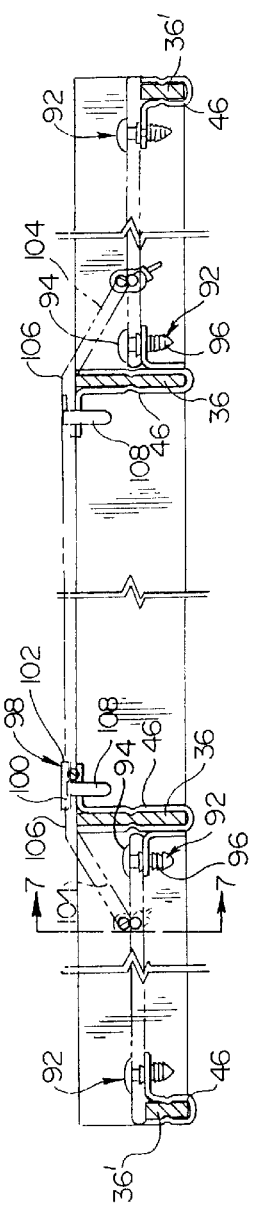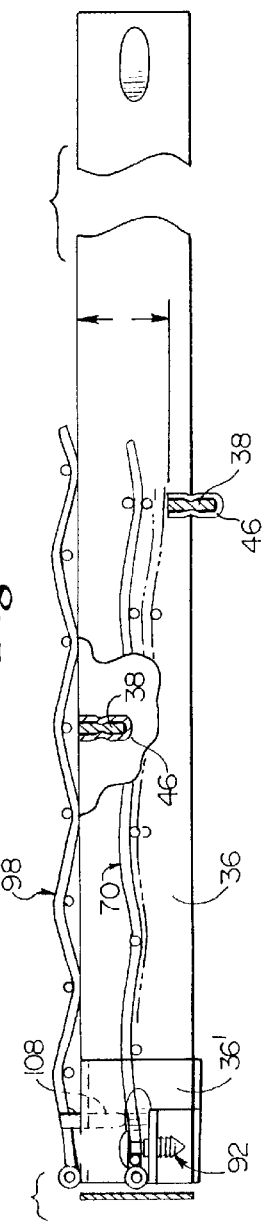

MODULAR FLOORING SYSTEM

TECHNICAL FIELD

The present invention is broadly related to the field of animal husbandry. More narrowly, however, the invention deals with modular animal flooring which includes a frame and a locking mechanism for mating the various modular components together. A preferred embodiment of the invention focuses on a flooring system, modular in form, which includes three sections. An elevated first section defines a surface on which a sow can be disposed during feeding. On either side of the elevated feeding surface is a creep area on which small piglets can be comfortably positioned while feeding from the sow.

BACKGROUND OF THE INVENTION

Flooring systems for animal shelters, typically, utilize woven metal or metal mesh which is coated with anti-corrosive material. Such a material protects the metal frame components from oxidation and deterioration from animal urine and fecal matter.

Prior art dictates that such flooring systems be assembled and molded into a unitary structure. Such a structure is, of course, considerably bulky, and this creates its own unique problems. Further, however, such structures create manufacturing problems as well as shipping and installation problems. Even further, however, warranty problems arise as a result of the one-piece construction.

As can be seen, while protective coatings go far toward protecting the metal core, if a coating becomes eroded at a particular location, it might be necessary to replace the total flooring system assembly rather than just a part thereof. This can be both costly and inconvenient.

As one might garner from the discussion to this point, it might be perceived that it would advantageous to make the flooring system modular. To do so, however, involves certain unique problems. For example, it is extremely important to maintain the various components securely connected to each other by means of an appropriate locking system.

Various other problems exist in specific applications. For example, irrespective of whether the flooring system is modular or of a unitary construction, in a sow barn flooring application, there are various considerations that must be taken into account. Because of the significant disparity in size between a sow and her piglets, it is important to protect the piglets from becoming trapped and even crushed under the weight of the sow. This is a particularly important consideration during feeding.

Another important consideration is providing access to the teats of the sow to all of the piglets in a litter. In any litter some piglets are more hearty and aggressive, while others are less so. Optimally, both rows of teats of a reclining sow should be made accessible to the piglets in the litter so that the less aggressive piglets can feed from the lower row of teats and the more aggressive can be feed from the upper row.

It is to these shortcomings and dictates of the prior art that the present invention is directed. It is a flooring system which solves problems of the prior art while not sacrificing desirable features dictated by the prior art.

SUMMARY OF THE INVENTION

The present invention is a modular flooring system for use in an animal shelter. The system includes a base frame which has a pair of end crossbars and a plurality of longitudinally extending support members which interconnect the end crossbars. The base frame also employs a plurality of interconnecting elements which extend generally transverse to the longitudinally extending support members to interconnect those members. In the preferred embodiment, a first panel is supported on the base frame. Such a first panel is disposed extending generally along one lateral edge of the frame. The base frame also supports a second panel, a portion of which is intended to support an animal mother during feeding of its young. This portion on which the mother is intended to be disposed defines a second plane elevated above the first plane and generally parallel thereto. The second panel, however, includes a ramp portion which angles downwardly from a longitudinally extending side edge of the animal mother supporting portion of the second panel toward, and into engagement with, the first panel. Finally, means are provided for locating the first and second panels on the frame in desired positions relative to one another.

In one embodiment of the invention, the end crossbars, longitudinally extending support members, and interconnecting elements which comprise the base frame are disconnectable from each other. This renders the flooring system even more modular.

Optimally, the flooring system includes a pair of first panels which function as creep panels. In this embodiment, the creep panels are supported on the base frame straddling the portion of the second panel which is intended to support the animal mother. In such a construction, a ramp portion extends downwardly from each of opposite longitudinally extending side edges of the animal mother supporting portion of the second panel to engage a corresponding creep panel. Generally, the structure, when assembled, is symmetrical.

Assembly of the base frame, in the modular embodiments, is facilitated by employment of a series of clips. One series of clips can be carried by each of the end crossbars on an inwardly facing surface thereof. One clip in the series carried by one of the crossbars corresponds with a clip in the series carried by the other crossbar. Corresponding clips function to receive opposite ends of a longitudinally extending support member therein to facilitate assembly of the base frame. A clip in accordance with a preferred embodiment thereof includes inwardly facing, outwardly urgable opposed surfaces, these surfaces normally being spaced laterally from each other at a defined distance. One or both of the surfaces is provided with a detent. If detents are provided in both surfaces, they would, typically, be immediately opposite each other. An end of a longitudinally extending support member receivable in a clip is provided with a corresponding recess or recesses sized and located so that, as the end of the longitudinally extending support member is inserted between the opposed surfaces of the clip into which it is inserted so as to align the detent or detents with a corresponding recess or recesses, the end of the support member urges the opposed surfaces of the clip outwardly to effect secure retention.

Similar clips can be carried by the longitudinally extending support members on surfaces thereof which, when the frame is assembled, face each other. These clips serve to capture and retain therein ends of the interconnecting elements to effect full assembly of the base frame. Construction of these clips, again, can be similar to those carried by the end crossbars.

Locating means can be included so as to facilitate disposition of the first and second panels at intended locations. In the case of the second panel, a plurality of locating pins can be employed to effect proper positioning of that panel. In the preferred embodiment, such locating pins would extend downwardly from the portion of the panel which defines the second plane. The locating pins would, in turn, cooperate with a corresponding plurality of brackets carried by the base frame. Such brackets would have apertures formed therein to receive the locating pins therein.

The present invention is thus an improved animal shelter modular flooring system. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 1 is a perspective view of the preferred form of the invention with some parts cut away and some parts exploded;

FIG. 5 is a fragmentary top plan view of the invention of FIGS. 1 and 2 with some parts shown in phantom lines;

FIG. 6 is a fragmentary sectional elevation taken generally along reference line 6—6 of FIG. 5;

FIG. 7 is a fragmentary sectional elevation taken generally along reference line 7—7 of FIG. 6, and showing secondary position apart thereof in phantom lines;

DETAILED DESCRIPTION OF THE INVENTION

Figure 2:
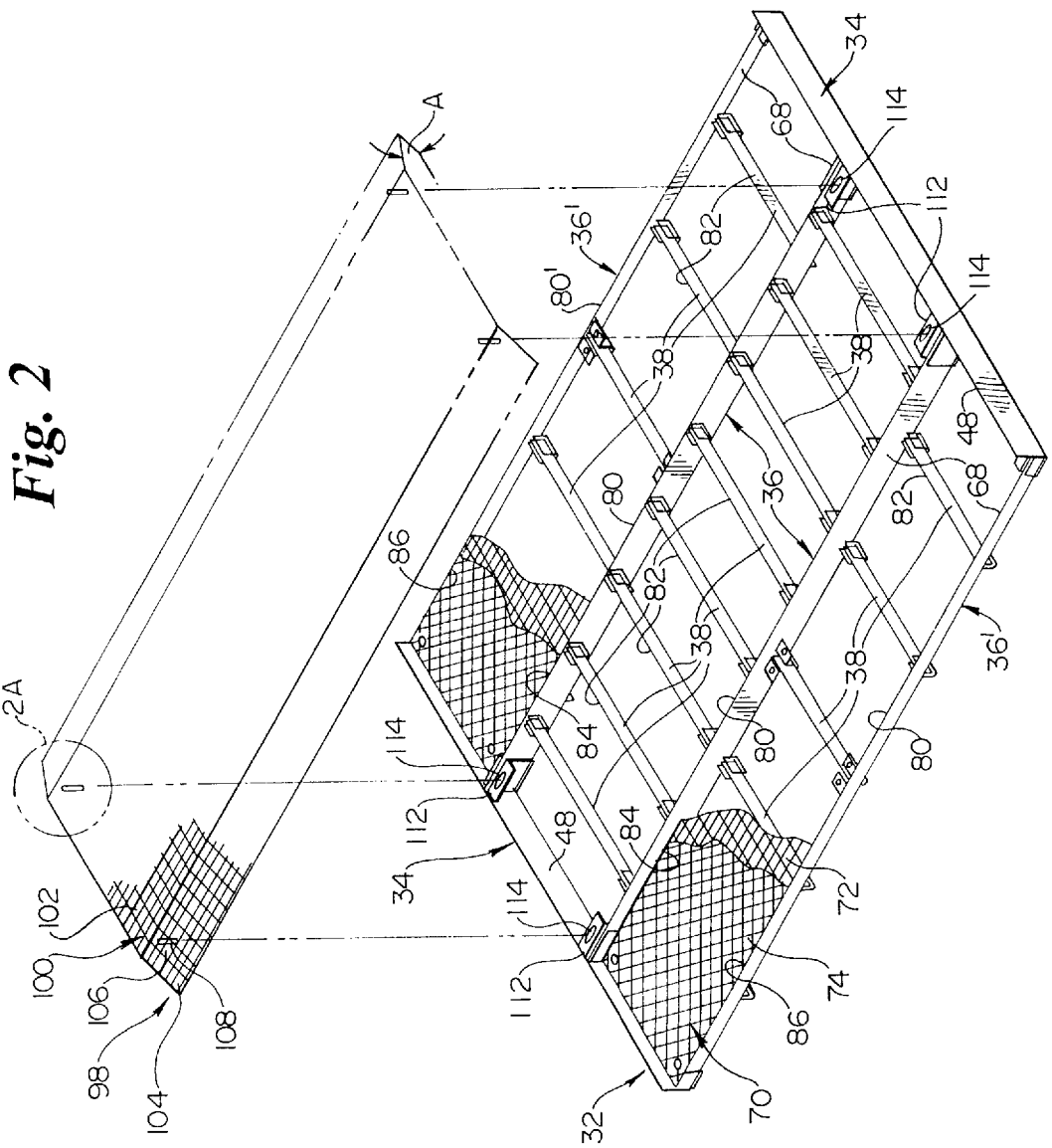
FIG. 2 is a partially exploded perspective view thereof.
Figure 3:
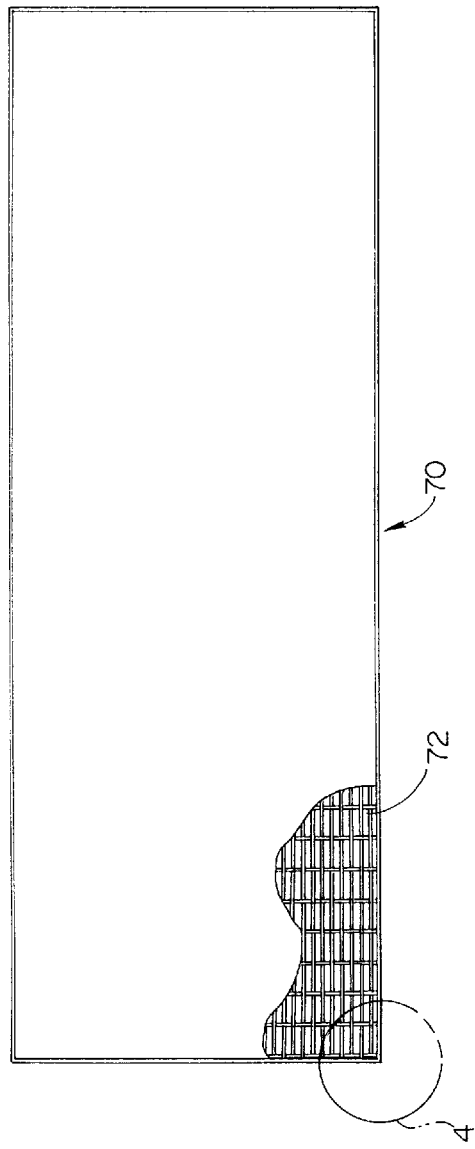
FIG. 3 is a top plan view of a creep floor panel assembly with some parts cut away.

Referring now to the drawings wherein like reference numerals illustrate like elements throughout the several views, FIGS. 1, 2, and 5–7 best illustrate the overall flooring system 30. The system 30 includes a base frame 32 which is comprised of a pair of end crossbars 34 interconnected by a plurality of longitudinally extending support members 36. The support members 36 extend generally transverse to said end crossbars 34, and the base frame 32 can be constructed, in certain embodiments, such that support members 36 are mated, when desired, to the crossbars 34 in a manner as will be discussed hereinafter.

The figures also show a plurality of interconnecting elements 38 which span, in a transverse fashion, spaces between adjacent longitudinally extending support members 36. The interconnecting elements 38 are secured to the support members 36 in a manner as will be discussed hereinafter also.

It will be understood, however, that, in the embodiment illustrated, the various components of the base frame 32 are intended to be disconnectable from each other to facilitate cleaning of the flooring system 30 and to enable replacement of a small component thereof rather than having to replace the whole frame 32 if one small section becomes corroded or deteriorates in some other manner.

As can be seen, the base frame 32 can include a relatively large number of components. FIG. 1 illustrates a frame 32 having two end crossbars 34, four longitudinally extending support members 36,36' (two laterally central and two laterally outer members), and at least sixteen interconnecting elements 38. It will be understood, however, that this number of components is not exclusive, and any appropriate number is contemplated as being within the scope of the invention.

One type of material intended to function as the various components comprising the base frame 32 is rectangular mechanical bar stock. Such bar stock would, typically, be coated with a plastic material such as polyurethane. These components are thus more resistant to corrosive effects of animal urine and fecal matter.

Figure 20:
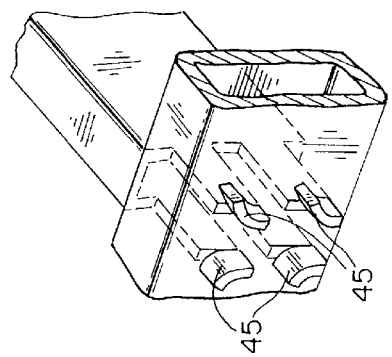
FIG. 20 is a perspective view similar to FIG. 19 with the components in an assembled configuration.
Figure 19:
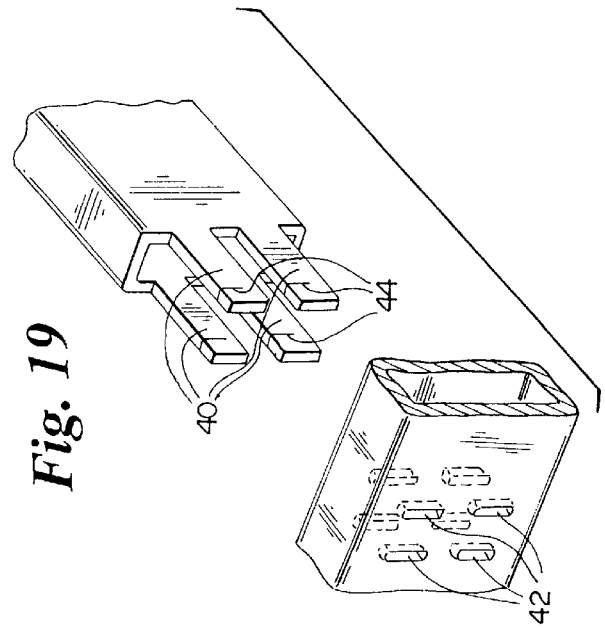
FIG. 19 is an exploded perspective view of an alternative structure for mating components together.

It is envisioned that rectangular mechanical tubing might also be used. FIGS. 19 and 20 illustrate such a material as an alternative construction. The components illustrated in those two figures are secured together in a way different than when bar stock is utilized. Those figures illustrate ends of tubing which have four extensions 40 protruding therefrom. Those extensions 40, when mating is desired, can be inserted through apertures in the component with which mating is intended, those apertures 42 being located so that the extensions 40 can be made to register therewith and pass therethrough.

Distal ends of the extensions 40 are shown as being slitted (as at 44) at an angle at generally 90° relative to an axis of elongation. The ends of the extensions 40 are malleable, and, in view of the slitting 44, the tabs 45 thereby formed can be folded outwardly after the extensions 40 have been passed through the apertures 42 in the component to which mating is desired. This achieves the configuration illustrated in FIG. 20, and the two components are held securely one to the other.

Figure 10:
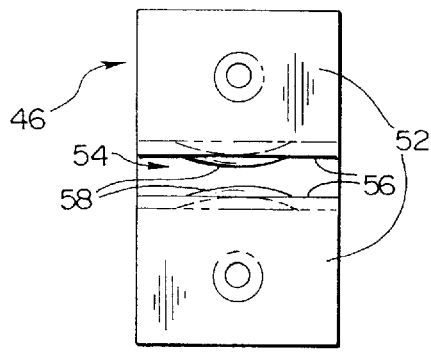
FIG. 10 is a top plan detail view of a typical clip of the invention before assembly.
Figure 11:
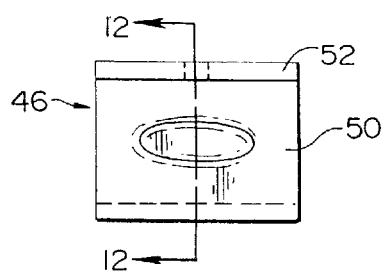
FIG. 11 is a side elevational view thereof.
Figure 12:
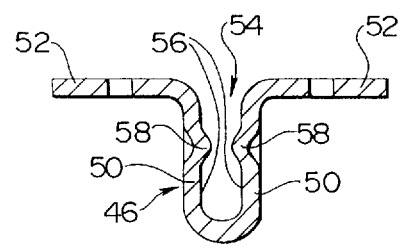
FIG. 12 is a sectional elevation view thereof taken generally along reference line 12—12 of FIG. 11.

FIGS. 10–12 illustrate a clip 46 that can be used to effect, in a preferred embodiment, mating of the various components. Such a clip 46 can be adhered to an inwardly facing wall 48 of each end crossbar 34 at various desired locations therealong. The clips 46 are shown as being generally U-shaped, each of two U-arms 50 of the clip 46 having a transverse flange 52 at its upper end. The clip 46 is secured to the end crossbar 34 in any appropriate manner (such as welding) with the axis of a trough 54 defined by the "U" extending generally normal to the face 48 of the end crossbar 34 to which it is secured. This positions the clip 46 in an orientation to receive an end of a longitudinally extending support member 36.

As shown in FIGS. 10–12, each U-clip 46 defines a pair of inwardly facing, outwardly urgable opposed surfaces 56. These surfaces 56 are normally spaced at a defined distance from each other. At least one of these surfaces 56 would, typically, have a detent 58 extending therefrom. In the preferred embodiment shown in FIGS. 10–12, however, each of the surfaces 56 is shown as having a detent 58 extending therefrom, and these detents 58 are generally immediately opposite one another.

Figure 8:
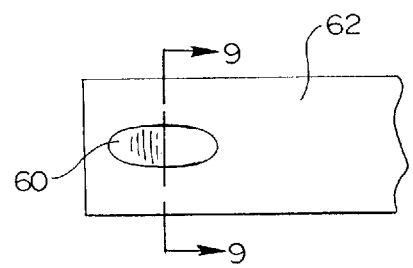
FIG. 8 is a fragmentary side elevational detail view of a typical frame piece.
Figure 9:
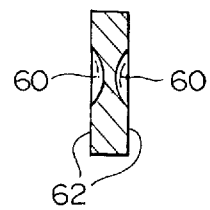
FIG. 9 is a sectional elevation taken generally along reference line 9—9 of FIG. 8.

FIGS. 8 and 9 illustrate an end of bar stock material such as that typically used for the longitudinally extending support members 36. The figures show aligned recesses 60 formed in oppositely facing sides 62 of the bar stock. The recesses 60 are sized, shaped, and positioned within the end of the bar stock to cooperate with the detents 58 formed in the inwardly facing surfaces 56 of a clip 46. The bar stock material has a width so that, as the bar stock end is urged into the trough 54 defined by the U-clip 46, the bar stock material will engage the detents 58 and, thereby, urge the inwardly facing surfaces 56 apart. When the bar stock material achieves a position at which the detents 58 become registered with the recesses 60, the detents 58 will pop into the recesses 60, and the U-arms 50 of the clip 46 will snap inwardly to retain the end of the bar stock therewithin.

It will be understood that the size and shaping of the various components is such that a secure mating can be effected. These parameters will be such, however, that it will not be impossible to pop the end of the bar stock out of the trough 54 when it is desirable to disconnect the various components.

It is envisioned that such a detent/recess combination would be employed to mate an end of a longitudinally extending support member 36 to one of the end crossbars 34. FIG. 1 illustrating four support members 36, four corresponding clips 46 would be adhered, in any appropriate manner, to an inwardly facing surface 48 of each of the end crossbars 34. One clip 46 in each of these series of four clips would correspond with one clip 46 in the series of four clips carried by the other of the end crossbars 34. As a result, each clip 46 of a pair of corresponding clips would receive one of opposite ends of a longitudinally extending support member 36 therein to secure the support members 36 to the pair of end crossbars 34 and, thereby, partially assemble the base frame 32.

Figure 22:
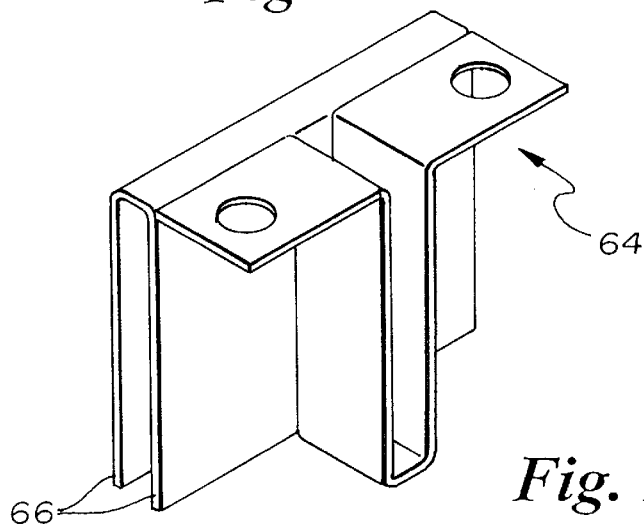
FIG. 22 is a view similar to FIG. 21 of another fitting.

FIG. 22 illustrates a similar clip 64 which might not be permanently and rigidly adhered to the inwardly facing surface 48 of an end crossbar 34. A pair of parallel flanges 66 would enable the clip 64 to be fitted over the end crossbar 34 and be supported thereby. As will be able to be seen, when this type of clip 64 is utilized, the location can be varied for convenience sake. Assembly of the flooring system 30 can, thereby, be facilitated. If desired, however, even the clip 64 of FIG. 22 could be permanently secured to an end crossbar 34.

Either type of clip discussed to this point can also be used in attaching the interconnecting elements 38 to the longitudinal support members 36. In this case, however, facing surfaces 68 of adjacent support members 36 would be provided with the clips, and the distal ends of the interconnecting elements 38 would be provided with the recess construction as described hereinbefore. The interconnecting elements 38 could, thereby, be rigidly secured to the support members. Again, if desired, the clips which are slidable along bar stock could be utilized.

It will be understood that, while a modular embodiment of the base frame 32 wherein the various components thereof are disassemblable from one another has been described herein, such an embodiment is not exclusive. Other embodiments are envisioned as being within the scope of the invention. For example, the base frame 32 might be unitarily constructed of components welded together to form a rigid base frame 32.

The flooring system 30 illustrated in FIGS. 1, 2 and 5–7 also employs at least one first panel 70 which is removably supported on the base frame 32. In fact, in those figures, two laterally spaced panels 70 are illustrated. These panels 70, as seen in the figures, are generally coplanar and comprised of two layers 72, 74. Each layer is manufactured from expanded metal. A first, lower layer 72 has generally rectangular-shaped apertures and is substantially rigid mesh or screen so as to provide support for young animals 76 seeking to feed from their mother 78, as will be described hereinafter. An upper layer 74 is also formed from an expanded metal mesh or screen material, and the figures illustrate this layer 74 as having diamond-shaped apertures. The second layer 74 overlies the first layer 72, and the layers, together, provide a sturdy surface that gives relatively decent traction for the young animals 76.

As best seen in FIGS. 1 and 5–7, the central longitudinally extending support members 36 have a vertical dimension which is greater than the outermost support members. Upper surfaces 80 of the outermost support members are flush with upper surfaces 82 of the interconnecting elements 38 to thereby define a plane of support for the first, or creep panel 70. The creep panel 70 is provided with a length so that it will fit between the inwardly facing surfaces 48 of the end crossbars 34 and a width so that, when one longitudinally extending edge 84 of the panel 70 is in engagement with an outwardly facing surface 68 of a central support member, the opposite side edge 86 of the panel 70 will be substantially at the outermost support member.

As seen in FIG. 1, while not all of the clips receiving inner ends of the interconnecting elements 38 are provided with generally horizontal flanges 52, certain of the clips are. Those flanges 52 are provided with apertures 88, and each aperture 88 can receive the shank 90 of a retainer 92, having a large head 94, which has been passed through the dual layers of screen or mesh and through the aperture 88. The retainer 92 is provided with what can be a conical structure 96 so that the shank 90 can be ramped through the aperture 88 and then have the conical structure 96 pop out to retain the panel 70 to the base frame 32. It will be understood that such retainer structures and their corresponding flanges would be strategically positioned about the base frame 32.

The figures also illustrate a second panel 98 which, in the preferred embodiment, includes three portions. One portion 100 comprises a surface 102 intended to support the animal mother 78, and this portion 100, when the panel 98 is positioned on the base frame 32, defines a plane which is substantially parallel to the plane defined by the creep panels 70. This plane, however, is elevated at a height above the plane of the creep panels 70.

The other two portions are ramp portions 104 which are symmetrical to the animal mother support portion 100. Each ramp portion 104 intersects the animal mother portion 100 along a side edge 106 thereof and, when the second panel 98 is in position on the base frame 32, angles downwardly to engage a corresponding creep panel 70. This construction enables young animals 76 to access both of two rows of teats of the animal mother 78 in a disposition lying on her side on the second plane defining portion 100. This feature will be discussed more hereinafter.

The specific construction of the second panel 98 would, typically, employ expanded metal also. In the embodiment illustrated in the figures, however, a single layer of mesh or screen is shown as being utilized.

In the case of both the first and second panels 70, 98, a coating material can be used to protect the expanded metal. Typically, the coating would be plastic and could be polyurethane.

Means can be provided for locating the first, creep panels 70, and the manner in which this would occur has been discussed hereinbefore. Means can also be provided for locating the second panel 98 in its desired position and location, and the means envisioned in accordance with the preferred embodiment is best illustrated in FIGS. 2 and 2A. As previously discussed, the vertical dimension of the central support members 36 is, in this embodiment, greater than that of the outermost support members 36'. Consequently, the upper surfaces 80 of the centralmost support members 36 will be higher than the upper surfaces of the creep panels 70. The second panel 98 can then be seated on the upper surfaces 80 of the centralmost support members 36. FIG. 2A illustrates a locator pin 108 for orienting the second panel 98 in a desired orientation. FIG. 1 illustrates a series of flanges 112 having elongated eyes 114 formed therein to receive the locator pins 108, only one of which is illustrated in FIG. 2A. The elongated eyes 114 are located at positions relative to the positions of the locator pins 108 so that position and orientation which is desired will be achieved. It will be understood that, with the locator pins 108 extending through the elongated eyes 114 in the flanges 112 carried by the base frame 32, retainers would probably not need to be used. The locator pins 108 would be sufficiently long so that it would be unlikely that the second panel 98 would become detached.

Figure 4:
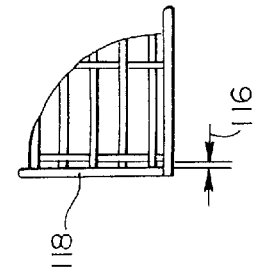
FIG. 4 is an enlarged fragmentary top plan detail view taken from the area encircled at 4 in FIG. 3.

FIG. 4 illustrates a space 116 between the expanded metal of the second panel 98 and the perimeter frame 118 thereof. The presence of such spacing enables application of the desired coating without any obstruction, and it also facilitates cleaning.

FIG. 7 illustrates, in phantom, that the creep panels 70 can be sufficiently flexible so that, as animals move therealong, flexure can occur. By providing for such flexure, the animals will be afforded a soft surface, and injury to the animals will be minimized.

The embodiment described to this point would, typically, be employed in the United States. In Europe, however, an embodiment utilizing longitudinally extending support members having the same vertical dimension would be installed. As will be able to be seen then, the support members will not function to undergird the second plane defining portion of the second panel 98'. For this reason then, the second panel 98' in the embodiment illustrated in FIGS. 13–17 is provided with at least two trusses 120 extending generally perpendicular to an axis of elongation of the panel. These trusses 120 will afford support to the animal mother 78 reclining on the second panel 98'. Again, in this embodiment, as in the case of the embodiment described hereinbefore, locator pins 110 are provided, but tips of these pins 110 would sit on flanges rather than being received in apertures.

Figure 13:
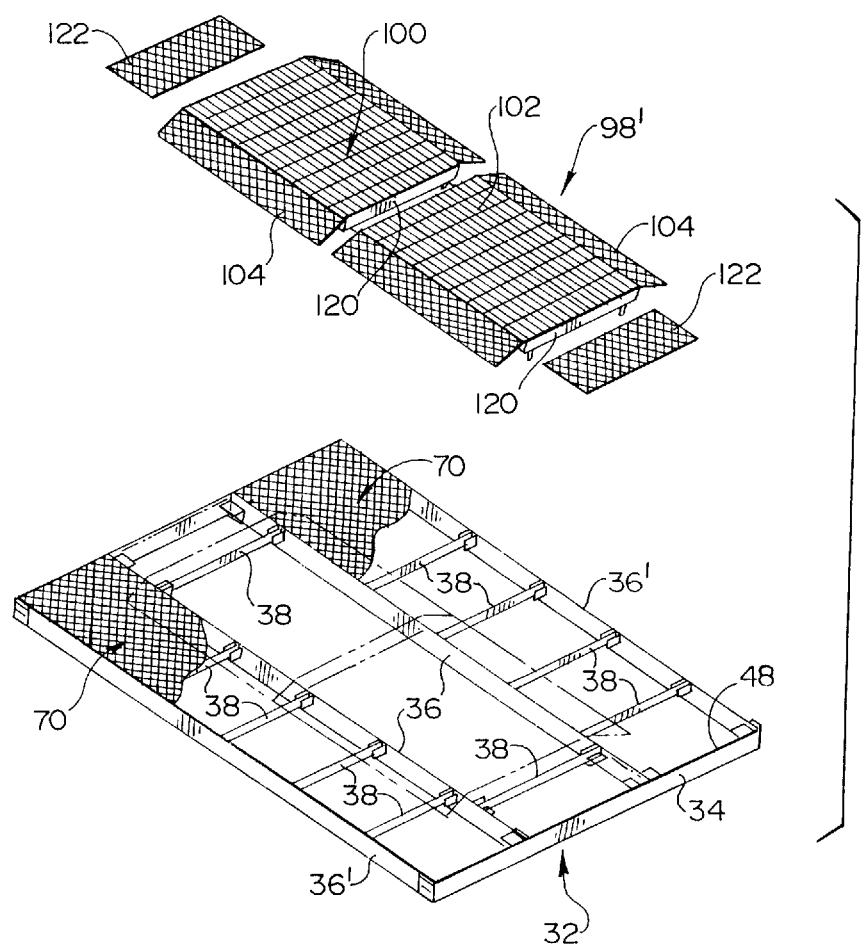
FIG. 13 is an exploded perspective view of an alternate embodiment of the invention with some parts cut away and some parts shown in phantom assembled position.
Figure 14:
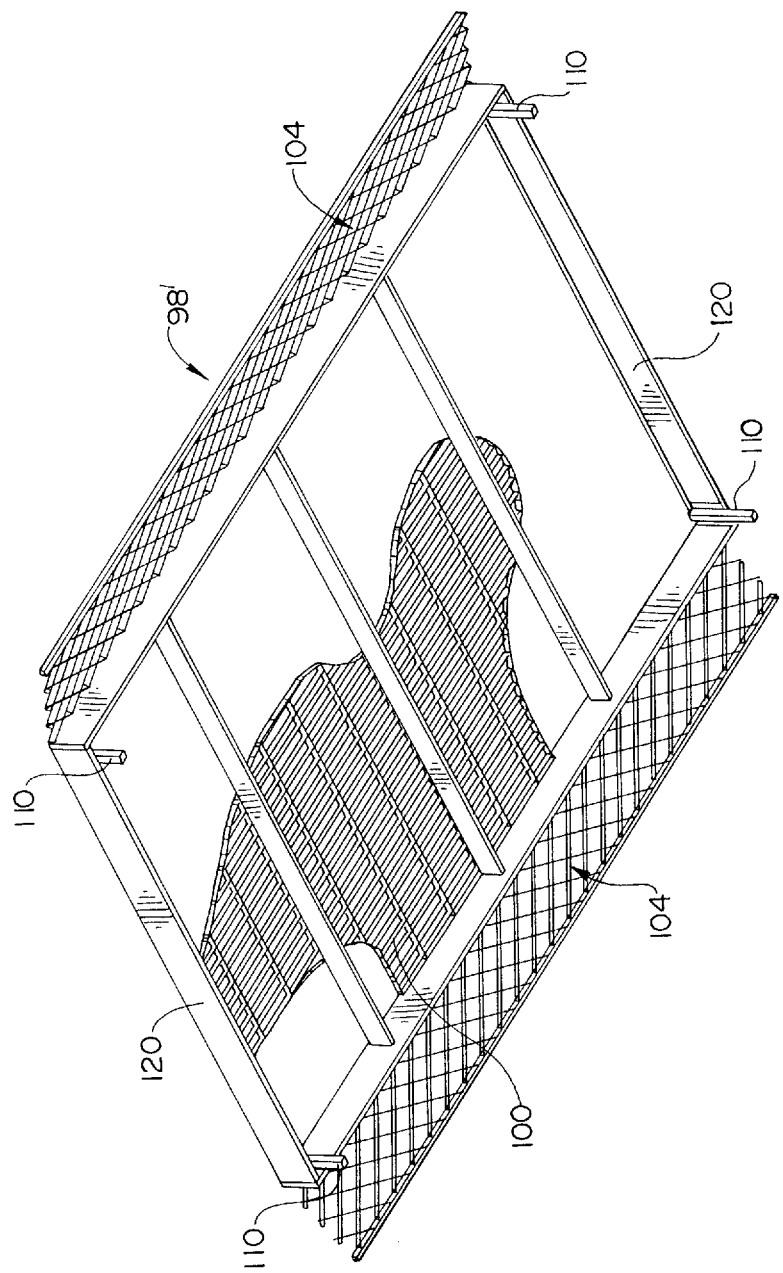
FIG. 14 is a bottom perspective view of a panel assembly thereof.
Figure 15:
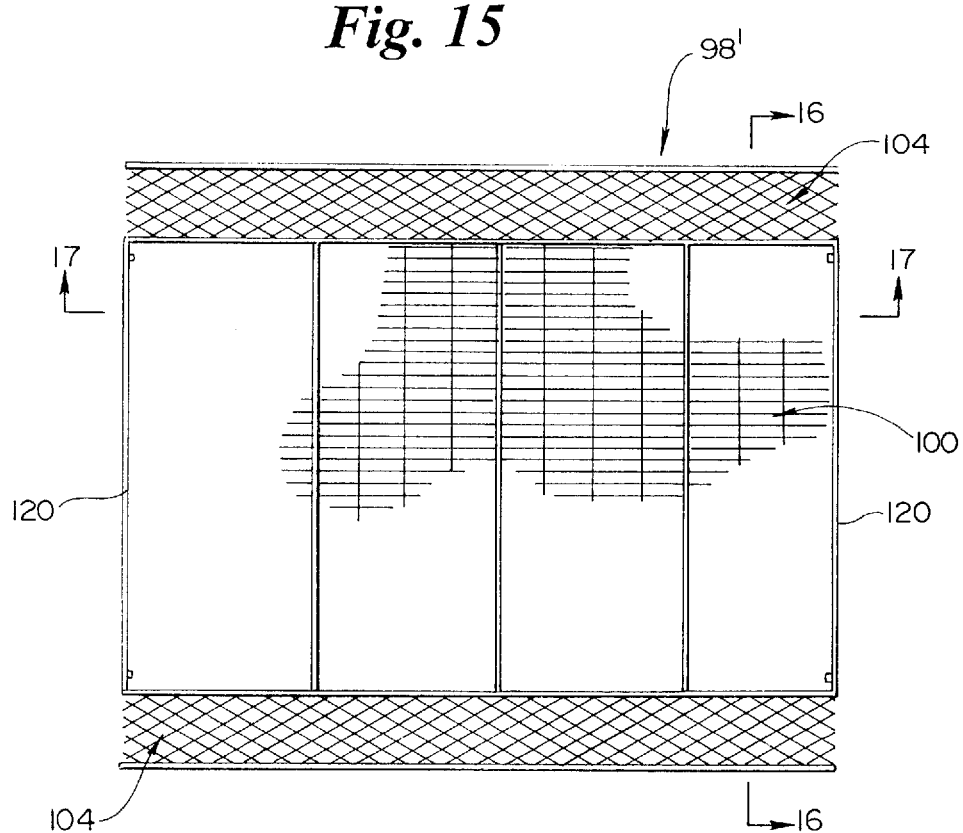
FIG. 15 is a bottom plan view thereof.
Figure 16:
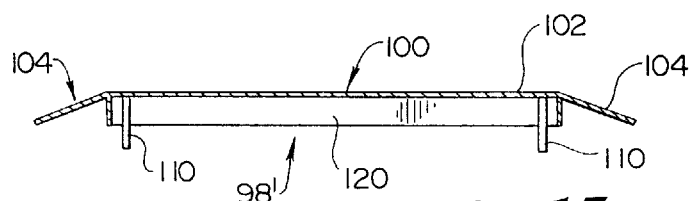
FIG. 16 is a sectional elevation taken generally along reference line 16—16 of FIG. 15.
Figure 17:
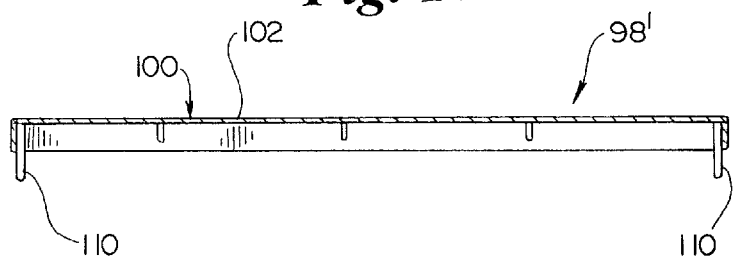
FIG. 17 is a sectional elevation taken generally along reference line 17—17 of FIG. 15.

FIG. 13 illustrates a second panel which is bifurcated along its length and which has an overall length less than that of the frame. Consequently, spacer panels 122 are interposed at opposite ends of the second panel 98' to complete the floor system 30. The spacer panels 122 are substantially coplanar with the creep panels 70 and are similarly constructed and coated.

Figure 21:
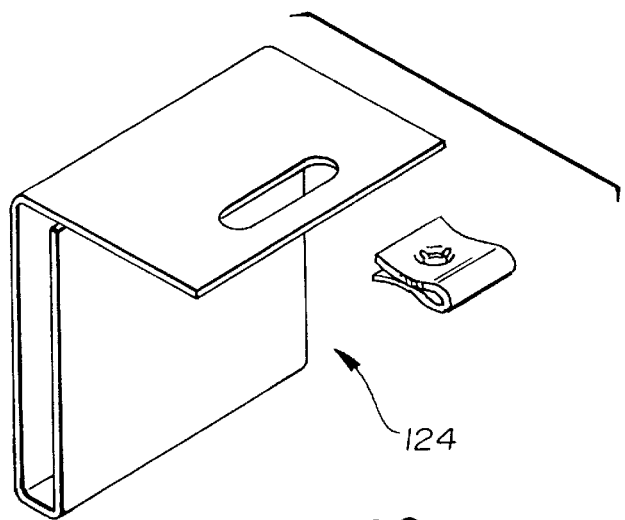
FIG. 21 is a perspective view of a fitting employable in the invention.
Figure 23:
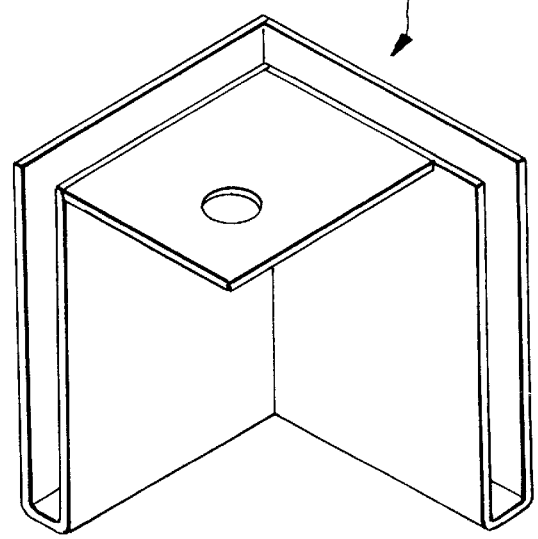
FIG. 23 is a perspective view similar to FIGS. 21 and 22 of a third fitting.

FIGS. 21 and 23 illustrate additional fittings 124, 126 which can be attached to the frame members 36 to define flanges having apertures therein for use in securing, for example, the creep panels 70 to the frame. These fittings have a construction similar to that of FIG. 22 (discussed hereinbefore) and, as a result, they can be more flexible in application in that they can be more readily attached and detached and, in some cases, moved to different locations along the member to which they are secured.

Figure 18:
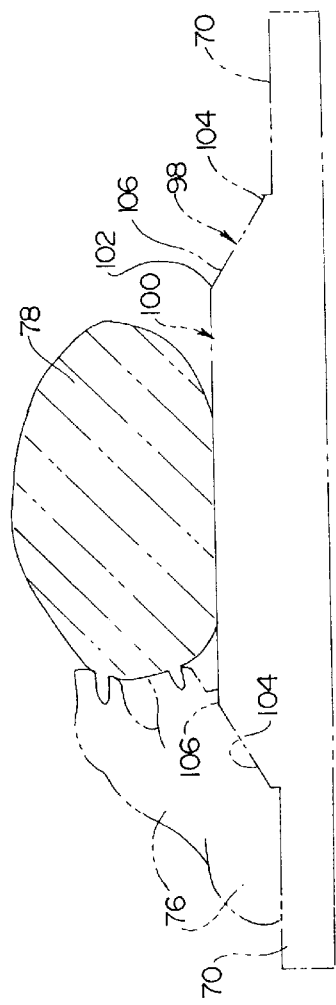
FIG. 18 is a simplified function end view diagram of a profile typical of both embodiments showing the relative position of an adult female and nursing infant animals.

FIG. 18 illustrates a sow 78 disposed on the support portion 100 of the second panel 98 and its piglets 76 taking milk from the sow's teats. Because of the construction of the first and second panels 70, 98 and their maintenance in positions relative to one another, surfaces are afforded to the piglets wherein weaker piglets can easily have access to a lower row of teats of the sow 78. At the same time, however, stronger and more aggressive piglets can have access to the upper row of the sow's teats. As a result, the piglets are safer in that they are unlikely to be injured by one another or by the sow rolling over onto the piglets. It will be understood that the angles of the ramp portions 104 and the length of those ramp portions 104 can be a function of the typical size of the young animals intended to feed on the flooring system.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. An animal shelter modular flooring system, comprising:
    (a) a base frame having a pair of end crossbars, a plurality of longitudinally extending support members extending generally transverse to said end crossbars, and interconnecting elements extending generally transverse to said support members;
    (b) a first panel removably supported on said base frame and defining a first plane;
    (c) a second panel removably supported on said base frame and including a portion, on which an animal mother is disposed during feeding of its young, positioned to define a second plane, elevated above said first plane and generally parallel thereto, and a ramp portion angling downward from said second plane defining portion of said second panel toward said first panel; and
    (d) means for locating said first and second panels on said frame in desired positions relative to one another.

2. A modular flooring system in accordance with claim 1 wherein said end crossbars, said longitudinally extending support members, and said interconnecting elements are disconnectable from each other.

3. A modular flooring system in accordance with claim 2 further comprising a series of clips carried by each of said end crossbars on an inwardly facing surface thereof, one clip in the series carried by one of said end crossbars corresponding with one clip in the series carried by the other of said end crossbars, wherein each clip of a pair of corresponding clips receives one of opposite ends of a longitudinally extending support member therein.

4. A modular flooring system in accordance with claim 3 wherein each of said clips includes inwardly facing, outwardly urgable opposed surfaces normally spaced laterally from each other at a defined distance, at least one of said opposed surfaces having a detent extending therefrom, and wherein an end of a longitudinally extending support member receivable in a clip has a recess formed therein and is configured so that, as said end is inserted between said opposed surfaces of the clips to align said detent and said recess, said end urges said opposed surfaces outwardly to effect secure retention of said end in said clip.

5. A modular flooring system in accordance with claim 4 further comprising a series of clips carried by each of said longitudinally extending support members on surfaces which, when said base frame is assembled, face each other, one clip in the series carried by one of said longitudinally extending support members corresponding with one clip in the series carried by an adjacent longitudinally extending support member, wherein each clip of a pair of corresponding clips receives one of opposite ends of an interconnecting element therein.

6. A modular flooring system in accordance with claim 5 wherein each of said clips carried by said longitudinally extending support members includes inwardly facing, outwardly urgable opposed surfaces normally spaced laterally from each other at a defined distance, at least one of said opposed surfaces having a detent extending therefrom, and wherein an end of an interconnecting element receivable in a clip has a recess formed therein and is configured so that, as said end of said interconnecting element is inserted between said opposed surfaces of the clip carried by a longitudinally extending support member to align said detent and said recess, said end of said interconnecting element urges said opposed surfaces outwardly to effect secure retention of said end of said interconnecting element in said clip.

7. A modular flooring system in accordance with claim 1, wherein said second plane defining portion has a longitudinally extending side edge, and wherein said ramp portion angles downwardly from said longitudinally extending side edge to engage said first panel.

8. The modular flooring system in accordance with claim 1, wherein said second plane defining portion is elevated above said first panel at a distance wherein teats of the animal mother, when it is reclined on said second plane defining portion, are accessible to the animal young located on said first panel and on said ramp portion.

9. The modular flooring system in accordance with claim 1, wherein said locating means comprises a plurality of locating pins extending downwardly from said second plane defining portion and a plurality of brackets, carried by said base frame, having apertures within which said locating pins are received.

10. An animal shelter modular flooring system, comprising:

(a) a base frame having a pair of end crossbars, a plurality of longitudinally extending support members and interconnecting elements extending generally transverse to said support members;

(b) a pair of generally coplanar creep panels removably supported on said base frame and defining a first plane, said creep panels being spaced laterally from one another;

(c) an animal mother support panel on which the animal mother is disposed during feeding of its young, said animal mother support panel removably supported on said base frame intermediate said creep panels and including a portion positioned relative to said creep panels to define a second plane elevated above said first plane and generally parallel thereto, and a pair of ramp portions, integrally formed with said second plane defining portion at side edges of said second plane defining portion, each of said ramp portions angling downward from said second plane defining portion to engage a corresponding creep panel; and (d) means for locating said animal mother support panel and said creep panels on said frame in desired positions relative to one another.

11. A modular flooring system in accordance with claim 10 wherein laterally centralmost longitudinally extending support members have a vertical dimension greater than laterally outermost longitudinally extending support members, and wherein said second plane defining portion is seated immediately on said laterally centralmost longitudinally extending support members.

12. A modular flooring system in accordance with claim 10 wherein all of said plurality of longitudinally extending support members have substantially the same vertical dimension, and further comprising means for maintaining said second plane defining portion elevated with respect to said longitudinally extending support members.

13. A modular flooring system in accordance with claim 12 wherein said animal mother support panel has longitudinal ends spaced inwardly from said pair of end crossbars, and further comprising spacer panels substantially coplanar with said pair of creep panels.

14. A modular flooring system in accordance with claim 10 wherein said creep panels comprise at least two overlying, expanded metal screens.

15. A modular flooring system in accordance with claim 14 wherein each of said expanded metal screens is coated with a plastic material to inhibit deterioration.

16. A modular flooring system in accordance with claim 10 wherein said end crossbars, said longitudinally extending support members, and said interconnecting elements are disconnectable from each other.

17. A modular flooring system in accordance with claim 16 further comprising a series of clips carried by said end crossbars and said plurality of longitudinally extending support members to effect connection of said end crossbars, said longitudinally extending support members, and said interconnecting elements to each other.

18. A modular flooring system in accordance with claim 17 further comprising a series of fittings attachable to said end crossbars and said plurality of longitudinally extending support members to support said creep panels.

* * * * *